Dec. 10, 1963 — R. P. McMANUS — 3,114,106
FREQUENCY DIVERSITY SYSTEM
Filed Nov. 23, 1960 — 2 Sheets-Sheet 1

INVENTOR.
ROBERT P. McMANUS
BY
ATTORNEYS

Dec. 10, 1963  R. P. McMANUS  3,114,106
FREQUENCY DIVERSITY SYSTEM
Filed Nov. 23, 1960  2 Sheets-Sheet 2

INVENTOR.
ROBERT P. McMANUS
BY
ATTORNEYS

United States Patent Office 3,114,106
Patented Dec. 10, 1963

3,114,106
FREQUENCY DIVERSITY SYSTEM
Robert Paul McManus, 1091 Albion St.,
San Diego 6, Calif.
Filed Nov. 23, 1960, Ser. No. 71,365
1 Claim. (Cl. 325—56)
(Granted under Title 35, U.S. Code (1952), sec. 266)

The invention described herein may be manufactured and used by or for the Government of the United States of America for governmental purposes without the payment of any royalties thereon or therefor.

The present invention relates to diversity systems for minimizing consequences of signal fading, and in particular to a frequency diversity system.

The problem which is effectively solved by the disclosed system is the minimizing of the consequences of signal fading incident to the transmission of radio energy over long distances. As is well known, automatic volume control is helpful in minimizing fading effects. However, AVC is not a complete solution to the problem of fading signals, because when the signal fades down into the noise level, all an AVC system can do is to bring up the noise level to the intensity that the signal should have. This difficulty can be solved almost perfectly, however, by the use of a diversity receiving system, of which two types are in use, namely, space diversity and frequency diversity.

Space diversity takes advantage of the fact that signals received at different locations do not fade at the same rate simultaneously. Thus, in the short-wave range of frequencies, 2 to 30 megacycles, tests show that signals received on antennas spaced in the order of 3 to 10 wavelengths will fade more or less independently. Again, at ultra-high and microwave frequencies, it has been found that though the signal received on any one antenna will occasionally fade to negligible amplitude, the signal will never fade out simultaneously on two antennas at different heights provided that these heights are properly related to each other.

The several antennas of the space-diversity system are each provided with a separate receiver. These receivers then go to a common output, so that a satisfactory received signal is obtained as long as the signal intensity from at least one of the antennas is acceptable. The several receivers are preferably operated from a common AVC system derived from the sum of the AVC output voltages of the various receivers. In this way the channel that receives the loudest signal at the moment dominates the situation, the other channels contributing little or nothing to the output at that instant either in the way of noise or signal.

In frequency diversity, advantage is taken of the fact that signals of slightly different frequencies do not fade synchronously. This possibility has been utilized to minimize fading in radio-telegraph circuits. In the old method for obtaining frequency diversity, multi-channel terminal equipment was utilized. For example, the AN/FCC–3 described in MIL HDBK–161, part 1; pages 169 to 172, November 18, 1958, has provision for 8 single teletype channels. To use this equipment in frequency diversity, the two channels selected as a diversity pair are connected together and if all 8 channels are used in diversity, there would be only 4 independent teletype channels. The output of this terminal equipment would then be fed into a transmitter. Utilizing the old method, the transmitter involved must be a high-level linear amplifier in order that the 8 channels will not mix with each other and produce a useless output. The old method requires two keying units for a single diversity channel and in addition the transmitter used must be a special linear type not in common use today.

The present invention solves the problems incident to long distance transmission by making use of a well known property of amplitude modulation and exploits this property by a special arrangement of existing equipment to accomplish a simplified diversity system. Therefore, an improvement of the instant invention over the old system is that it requires less equipment. The diversity system utilizing amplitude modulation only requires one keying unit for each diversity channel while the old system required two keying units for each channel. In addition the simplified diversity system uses a conventional transmitter, slightly modified, rather than a complete new linear transmitter. The simplified diversity system contemplates using the conventional amplitude modulated transmitter to radiate the signals involved and the radiated signals are picked up by a conventional receiver and fed into single sideband multi-channel teletype terminal equipment such as the AN/FCC–3.

Therefore, an object of this invention is to provide a system which will extend the utility of conventional amplitude modulated transmitters so that they may have the advantages of frequency diversity.

Another object of the instant invention is to provide a system utilizing conventional amplitude modulated transmitters which will work in conjunction with single sideband multi-channel teletype receiving systems.

Other objects and many of the attendant advantages thereof will become apparent from the ensuing detailed description.

In general, the purposes and objects of the instant invention are accomplished through the utilization of slightly modified existing equipment. The equipment comprises, for example, a conventional amplitude modulated transmitter adapted for frequency shift keying, on-off keying or phase shift keying wherein a carrier and two sidebands are created. In the operation of the device the carrier is suppressed to a minimal level and the upper and lower sidebands are conveyed, through appropriate circuitry, to the transmitter antenna for radiation into space. On the receiver end of the simplified diversity system the radiated upper and lower sidebands are received on an appropriate antenna and conveyed to a receiver for amplification of the upper and lower sidebands to a level dictated by the requirements of a multichannel single sideband teletype terminal equipment such as the AN/FCC–3. The AN/FCC–3 contains 8 channels and in the operation of the system pairs of channels are interconnected to form diversity pairs. Therefore, the output of the receiver containing the upper and lower sideband would be connected to an appropriate pair of channels in the terminal equipment. In that the information transmitted is duplicated in the upper and lower sidebands this means that there are two sets of sidebands or channels containing the same intelligence separated in the frequency spectrum, which is the condition necessary for frequency diversity. Therefore, frequency diversity is accomplished in a very simple manner through the use of existing conventional equipment.

The invention is illustrated and described in the accompanying drawings wherein like numerals indicate like elements.

Figure 1:
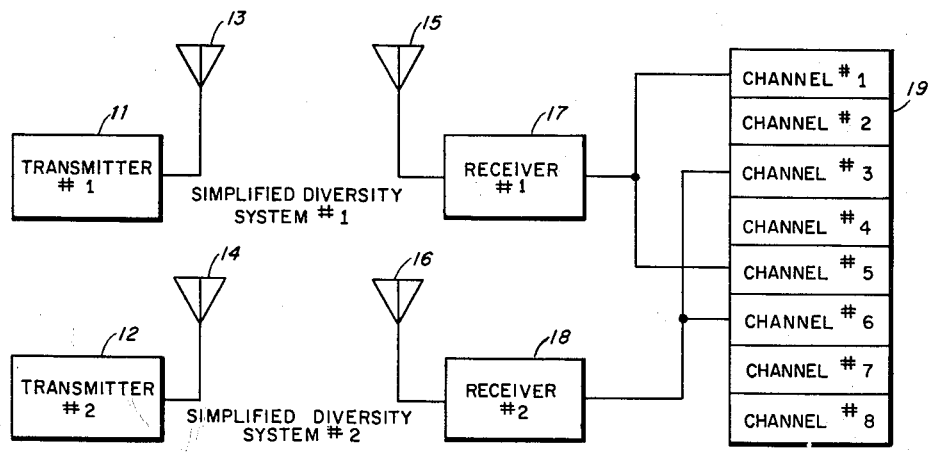
FIG. 1 is a block diagram of a simplified diversity system utilizing two independent SDS units operating into a single SSD receiving system.

In the block diagram of FIG. 1 are shown two simplified diversity units which consist of transmitters 11 and 12, antennas 13 and 14, receiver antennas 15 and 16, receivers 17 and 18, and a single sideband multi-channel teletype system, which for the purpose of illustrating the instant embodiment is a AN/FCC-3 indicated at 19. The amplitude modulated transmitters 11 and 12 may be either the on-off keying type, the frequency shift keying type or phase shift keying type. For the purposes of illustrating the invention, frequency shift keying is illustrated. Amplitude keying is illustrated and described in Radio Engineering, by F. E. Terman, 3rd edition, 1947, published by McGraw-Hill Book Company, Inc., pages 745 to 747. Phase shift keying is illustrated and described in Comparison of Binary Data Transmission Systems, by John G. Lawton, Cornell Aeronautical Laboratory, Inc., pages 54–61; 1958 Conference Proceedings IRE 2nd National Convention on Military Electronics.

Figure 2:
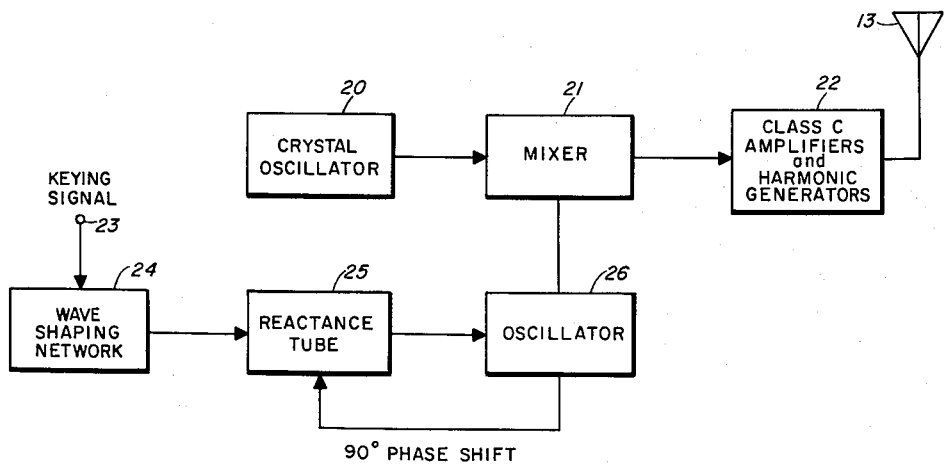
FIG. 2 is a block diagram of a device for accomplishing frequency shift keying.

FIG. 2 illustrates a means for accomplishing frequency shift keying and comprises a crystal oscillator 20, mixer 21, class C amplifiers and harmonic generators 22, a keying signal 23, wave shaping network 24, reactance tube 25, and the shift oscillator 26. Here the frequency used is the sum or difference frequency obtained by combining the output of the crystal oscillator 20 with the output of the shift oscillator 26 associated with the reactance tube 25 that is controlled by the keying signal. The output of the crystal oscillator 20 and shift oscillator 26 are combined in the mixer and the sidebands containing the shift frequency are amplified in the stage 22 and radiated on antenna indicated at 13. In the operation of the amplifiers the carrier is suppressed to a minimal value by conventional means which may be a balanced modulator or any other carrier suppressing means.

The principle of SDS (simplified diversity system) may be illustrated by examining the frequency spectrum of an amplitude modulated wave and comparing it to the frequency spectrum of a multi-channel teletype single sideband system. The instantaneous voltage of a carrier wave may be represented by (1) $\quad e(t) = \hat{E}_c \cos(2\pi f_c t + \theta)$ $\hat{E}_c$ = the amplitude of the sinusoidal carrier
$f_c$ = the frequency of the carrier
$\theta$ = the phase angle of the carrier If the modulation consists of two frequencies, $f_1$ and $f_2$, there arises for the amplitude modulation case;

(2) $\quad e(t) = \hat{E}_c [1 + m_1 \cos 2\pi f_1 t + m_2 \cos 2\pi f_2 t] \cos(2\pi f_c t + \theta)$ (3)

$$e(t) = \hat{E}_c \cos 2\pi f_c t + \frac{\hat{E}_c m_1}{2}[\cos 2\pi t(f_c+f_1) + \cos 2\pi t(f_c-f_1)]$$
$$+ \frac{E_c m_2}{2}[\cos 2\pi t(f_c+f_2) + \cos 2\pi t(f_c-f_2)]$$

Figure 3:
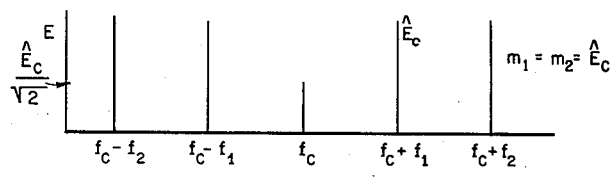
FIG. 3 is the radiated spectrum of an amplitude modulated wave.
Figure 4:
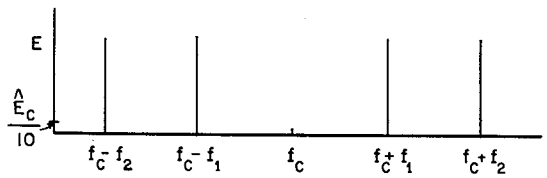
FIG. 4 is the radiated spectrum of an amplitude modulated wave with the carrier frequency depressed.

The right hand member of (3) may be represented graphically by FIG. 3, the radiated spectrum of an amplitude modulated wave, $f_1$ being the lowest sinewave modulating frequency, and $f_2$ being the highest modulating frequency. From (3) it is apparent that for any given sinewave modulating frequency, say $f_k$ such that $f_1 < f_k < f_2$, there is only one spectrum component contained in the upper sidebands, namely $(f_c+f_k)$ and only one spectrum component contained in the lower sidebands, namely $(f_c-f_k)$. This condition is unique for amplitude modulation only. It is also evident from (3) that all the necessary information is contained in either the upper or the lower sidebands. This means that there are present two sets of sidebands or channels containing the same intelligence separated in the frequency spectrum, which is the condition necessary for frequency diversity. Now let the carrier frequency $f_c$ be suppressed to some convenient value, as 20 db to 40 db, by suitable circuitry, for example a balanced modulator. Balanced modulators are illustrated and described in Radio Engineering by F. E. Terman, 3rd edition, pages 480 to 482, 1947, published by McGraw-Hill Book Company, Inc. The spectrum of FIG. 3 may now be represented by FIG. 4. FIG. 4 is the typical spectrum output from a conventional balanced modulator.

Figure 5:
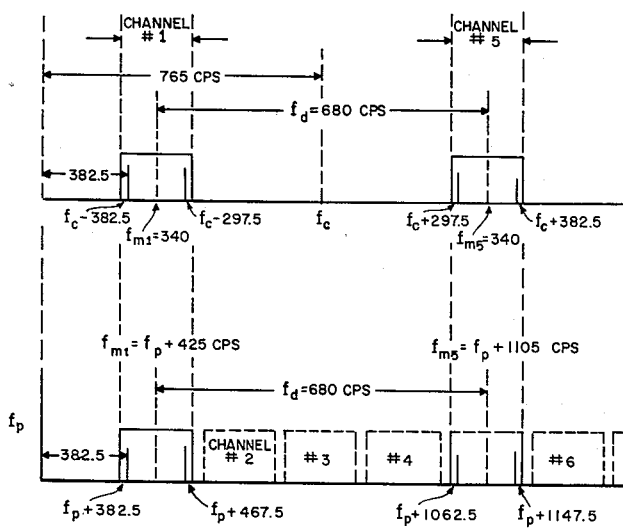
FIG. 5 is the radiated spectrum of an amplitude modulated wave with a space frequency and a mark frequency superimposed on the modulation.

Now let $f_1$ be 297.5 c.p.s., the space frequency, and $f_2$ be 382.5 c.p.s., the mark frequency, and $f_{m1}$ be 340 c.p.s., the midband center frequency, of a frequency shift keyed oscillator with 85 c.p.s. shift. If these are the modulating frequencies for the balanced modulator, and considering for simplicity's sake just the mark and space frequencies under steady state conditions, FIG. 4 may be redrawn as shown in FIG. 5.

Channel 1 is defined as the lower set of sidebands and channel 5 as the upper set of sidebands. Further, define $f_d$ as the difference frequency between the midfrequency of channel 5 and channel 1, so that there arises the following:

(4) $\quad f_d = f_{m5} - f_{m1} = 340 - (-340) = 680$ c.p.s.

From (4) it is seen that $f_d$ is only proportional to the modulating frequencies and can be given any appropriate value by suitable choice of modulating frequencies. Changing the value of $f_c$ has no effect on $f_d$ but it does position the SDS output in the radio frequency spectrum.

Now consider the diversity reception of a typical single sideband multi-channel teletype system using the AN/FCC-3 terminal equipment. For this equipment it is recommended that channels 1 and 5 be connected together to form a diversity pair. Similarly, channels 2 and 7, 3 and 6, etc., may be connected together to form other diversity pairs. This means that the information on channel 1 is the same as the information on channel 5 but they are separated in the frequency spectrum by $f_d$. With reference to the SSB teletype terminal equipment, the space frequency of channel 1 is 382.5 c.p.s. and the mark frequency is 467.5 c.p.s. The midband center frequency, $f_{m1}$, is 425 c.p.s. This represents frequency shift keying with a shift of 85 cycles per second. Similarly, the space frequency of channel 5 is 1062.5 c.p.s. and the mark frequency is 1147.5 c.p.s. The midfrequency $f_{m5}$ is 1105 c.p.s.

(5) $\quad f_d = f_{m5} - f_{m1} = 1105 - 425 = 680$ c.p.s.

Figure 6:
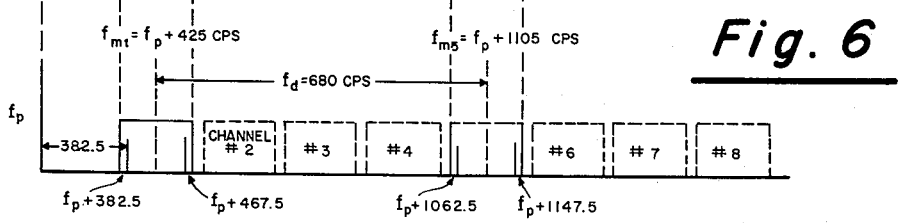
FIG. 6 is the graphical representation of the RF spectrum of a single sideband system using the AN/FFC-3 terminal equipment.

If a SSD system is operating on a pilot frequency of 5 mc. ($f_p = 5$ mc.), whether or not this pilot frequency, $f_p$, is radiated, it is still the frequency which must be heterodyned with the received SSB signals in order to place each channel in its proper position in the audio spectrum for filtering. In most SSB systems the heterodyning is accomplished in several steps to provide suitable intermediate frequencies for ease of amplifying and filtering, depending on the type of receiver used ahead of the terminal equipment. FIG. 6 is the graphical representation of the RF spectrum of a SSB system using the AN/FCC-3 terminal equipment.

From a study and comparison of FIGS. 5 and 6 it is evident that if a suitable carrier frequency $f_c$ is chosen for the SDS such that $f_c = 765$ c.p.s. $+ f_p$, then channels 1 and 5 of both the SDS and SSB systems are superimposed in the radio spectrum. Channel 1 of the SDS will be inverted with respect to channel 1 of the SSB system but this is easily remedied by reversing the discriminator output of channel 1 of its associated receiver before combining it with channel 5 for diversity operation.

If the SSB receiving system is capable of eight single channels, then there is a possibility of four independent diversity channels or four SDS channels. If two independent SDS units are operating into a single SSB receiving system, they will occupy four channels of the SSB system as shown in FIG. 1. In FIG. 1 SDS #1 uses channels 1 and 5 of the SSB receiving equipment and SDS #2 uses channels 3 and 6 of the SSB receiving equipment. For the purposes of explanation let SDS #1 be operating on a pilot frequency, $f_p$, of 5 mc. and let SDS #2 be operating on an $f_p$ of 6 mc. Also, let SDS #1 be at a different geographical location than SDS #2, so that at the receiving station SDS #1 and SDS #2 represent different signal strength. With these conditions the following operations are necessary. First, each SDS composite signal must be amplified the proper amount so that the components are at the same level at the input to the terminal equipment. This requirement is dictated by the type of terminal equipment used and is necessary for the AN/FCC–3. Second, each SDS signal must be translated in the frequency spectrum so that its two channels, in this case 1 and 5, and 3 and 6, fall in the respective passbands of the filters in the terminal equipment. This is easily accomplished by using a separate receiver for each SDS unit so that the total conversion is equal to the respective pilot frequencies. This reasoning may be extended to any number of SDS units that the SSB system is capable of receiving. In general, this number of SDS units is equal to half the number of single channels.

A question may arise at this point as to the adverse effects of $f_c$, the carrier frequency of SDS #1, if it is only suppressed 20 db, since it may fall in the middle of channel 3 if the SDS unit is operated at the same RF pilot, $f_p$, as channel 3 of the SSB equipment. There are two influencing factors here. The first is that $f_c$ is a steady sinusoidal carrier and contains very little intelligence. The second is, that at the cross-over points of the filters of the AN/FCC–3 the attenuation is approximately 15 db. If this order of filtering is adequate for adjacent channel signals, which contain a high degree of intelligence, then it is apparent that the carrier $f_c$, of the SDS unit, already suppressed 20 db will have a negligible effect on channel 3 provided the level of the SDS channels are the same as the SSB channels at the input to the terminal equipment. The level of the SDS channels may be adjusted in the receivers associated with the individual SDS units. If the operation of the system is such that each SDS unit is operating on a different pilot frequency, $f_p$, and their spectrums do not overlap, then there is no interference from $f_c$ at all in the terminal equipment. This may be seen from FIG. 1, by noting that the interference from $f_{c1}$ (SDS #1) would be in channel 3 of the terminal equipment but channel 3 of the terminal equipment is not connected to the receiver which is receiving SDS #1 where $f_{c1}$ is reproduced.

The preceding description of SDS has been based on a terminal equipment (AN/FCC–3) using frequency shift keying teletype but SDS will work equally as well with terminal equipment using "on-off" teletype or phase shift keying. Also, in this description a SDS unit has been limited to only one independent intelligence channel but with the use of time-division multiplex techniques this number of independent intelligence channels could be increased.

In the SDS only one frequency shift keyed oscillator, "on-off" keyed oscillator, or phase shift keyed oscillator is necessary to produce two channels for diversity operation while in the SSB system two oscillators are used. The frequency stability of this single oscillator in the transmitting unit need be no greater than the stability of the oscillators in the AN/FCC–3 terminal equipment (2 parts in $10^4$). In fact, if the frequency shift keying oscillator for channel 1, in this case, were modified to have a midband center frequency, $f_{m1}$, of 340 c.p.s. instead of 425 c.p.s., this oscillator could be used in the transmitter without further modification for SDS. Ordinarily the oscillator 20 of the transmitter of FIG. 2 does not oscillate at 340 c.p.s., however, the AN/FCC–3 equipment has a channel separation between channels 1 and 5 of 680 c.p.s. Therefore, if the channels 1 and 5 of the terminal equipment form a diversity pair it is necessary that the frequency of the oscillator used as the keying oscillator be 340 c.p.s. In the case where the channels 3 and 6 of the terminal equipment form a diversity pair the oscillator frequency of the transmitter 12 would be some other number dictated by the channel separation of channels 3 and 6 of the terminal equipment. The stability of $f_c$ is of the order of $10^7$ for operation from 1 to 30 megacycles. If the carrier frequency $f_c$ for SDS is derived or controlled from a stable oscillator which is the technique of the frequency synthesizers this is more than adequate for compatible operation of SDS and SSB receiving systems.

It has been determined that an efficiency of 70% is obtainable with a high level balanced modulator. For proof of this, reference is made to A High Level Single Sideband Transmitter, O. G. Villard, Jr., Proceedings I.R.E., November 1948, pp. 1419–1425. Therefore, any transmitter that has two tubes in its final amplifier would have essentially the same power output whether the tubes be in a balanced modulator circuit or a conventional class "C" amplifier. If a transmitter had a power output of "P" watts for a single frequency shift keyed channel, then after conversion to a balanced modulator, it would have a power output of "P" watts divided between two FSK channels and the suppressed carrier. If the carrier is suppressed 20 db, a conservative estimate of the power per channel would be $P/2.5$ which represents a loss of 4 db.

Frequency diversity can produce gains from 10 to 30 db. Readjusting these gains by the power lost in going from single channel to two channel, the net gain from SDS is then from 6 to 26 db.

The simplified diversity system would be especially useful for the small ship that has to send one way traffic over a long distance, for example, a picket ship with informaton on a fast moving aircraft. Diversity single sideband operation would be a decided advantage (20 db gain), for this ship but it may not have room for the usual terminal equipment and associated single sideband transmitters. An operational installation of SDS aboard this ship might include a frequency shift keyer similar to the one previously mentioned which is 19 inches wide, 19 inches deep, and 6 inches high. The transmitter instead of being a single sideband transmitter, could be a modified TBL. The TBL is a piece of radio telegraph transmitting equipment and is described in Instruction Book for Navy Models TBL–10 and TBL–11 Radio Telegraph Transmitting Equipment—NAVSHIPS 900, 390–IV, Westinghouse Electric and Manufacturing Company, Radio Division, Baltimore, Maryland. The TBL is mentioned here only because of its familiarity and to demonstrate by comparison the smaller size of an SDS transmitting installation. SDS would make it possible for the small ship to send its information with the advantages of frequency diversity into the single sideband receiving equipment of a larger ship or land base. Another possibility of this new system is the simplification of some of the time division multiplex terminal equipment. For example, the AN/UXC–2, described in MIL HDBK–161, part 3, pages 1989 and 1990, December 3, 1958, could be reduced in size by elimination of that portion of the equipment which is duplicated for diversity operation since SDS automatically provides a redundant inverted channel for diversity operation.

Obviously many modifications and variations of the present invention are possible in the light of the above teachings. It is therefore to be understood that within the scope of the appended claim the invention may be practiced otherwise than as specifically described.

What is claimed is:

A method of minimizing signal fading which comprises; modulating a carrier wave to produce an upper sideband, a lower sideband and a carrier so that the same information appears on both upper and lower sidebands; suppressing the carrier; radiating the upper and lower sidebands having the same intelligence; connecting two channels of a multi-channel terminal system together to form a diversity pair; receiving said upper and lower sidebands and amplifying the sidebanks to a desired level; and feeding the output of said receiver to said diversity pair.

References Cited in the file of this patent

UNITED STATES PATENTS

| | | |
|---|---|---|
| 1,666,158 | Affel | Apr. 17, 1928 |
| 1,935,776 | Hammond | Nov. 21, 1933 |
| 1,948,671 | Potter | Feb. 27, 1934 |
| 2,835,889 | Dyer et al. | May 20, 1958 |
| 3,048,782 | Altman | Aug. 7, 1962 |

OTHER REFERENCES

Nupp: A Critical Analysis of Some Communications Systems Derived From Amplitude Modulation, Proc. IRE, May 1959, pp. 697–704.

Terman, F. Radio Engineering, 3rd edition, McGraw-Hill Book Co., New York, 1947, p. 652.

Article by Wood et al., Electronics, vol. 33, No. 6, Feb. 5, 1960, pp. 47 to 49.